(12) United States Patent
Hirano et al.

(10) Patent No.: US 8,172,542 B2
(45) Date of Patent: May 8, 2012

(54) WIND TURBINE BLADE AND WIND TURBINE GENERATOR USING THE SAME

(75) Inventors: Toshiyuki Hirano, Tokyo (JP); Kouji Esaki, Tokyo (JP); Takao Kuroiwa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/027,690

(22) Filed: Feb. 15, 2011

(65) Prior Publication Data

US 2011/0182742 A1     Jul. 28, 2011

Related U.S. Application Data

(63) Continuation of application No. PCT/JP2010/070797, filed on Nov. 22, 2010.

(30) Foreign Application Priority Data

Dec. 22, 2009    (JP) ................................ 2009-290660

(51) Int. Cl.
     *F01D 5/14*          (2006.01)
(52) U.S. Cl. ..................... 416/230; 416/226; 416/241 A
(58) Field of Classification Search .............. 416/229 R, 416/230, 226, 241 R, 241 A
See application file for complete search history.

(56) References Cited

U.S. PATENT DOCUMENTS

| | | | | |
|---|---|---|---|---|
| 4,806,077 A | * | 2/1989 | Bost | ............................ 416/226 |
| 4,935,277 A | * | 6/1990 | Le Balc'h | ..................... 428/71 |
| 5,140,856 A | * | 8/1992 | Larsen | ........................... 73/455 |
| 2011/0031758 A1 | * | 2/2011 | Mitsuoka et al. | ............... 290/55 |

FOREIGN PATENT DOCUMENTS

| | | |
|---|---|---|
| EP | 2123431 A1 * | 11/2009 |
| JP | H06-066244 | 3/1994 |
| JP | 2004-535527 | 11/2004 |
| JP | 2006-118434 | 5/2006 |
| JP | 3930200 | 6/2007 |
| JP | 2007-255366 | 10/2007 |

* cited by examiner

*Primary Examiner* — Edward Look
*Assistant Examiner* — Ryan Ellis
(74) *Attorney, Agent, or Firm* — Manabu Kanesaka; Kenneth M. Berner; Benjamin J. Hauptman

(57) ABSTRACT

A wind turbine blade includes a laminated structure having an outer shell (1) having a shape of the blade, an upwind-side reinforcing section (4a) which reinforces a upwind-side part of the blade in the outer shell 1 and a downwind-side reinforcing section 4b which reinforces a downwind-side part of the blade in the outer shell 1. The outer shell 1 includes a first multidirectional material, a first unidirectional reinforcing material 12 and another multidirectional material 11 which are layered. The upwind-side reinforcing section 4a includes another unidirectional reinforcing material 12 provided between the first unidirectional reinforcing material 12 and another multidirectional material 11. The downwind-side reinforcing section 4b includes yet another unidirectional reinforcing material provided between the unidirectional reinforcing material 12 and the multidirectional material 11. The outer shell 1 includes a first core member 13 respectively provided between the upwind-side reinforcing section 4a and the downwind-side reinforcing section 4b on a leading edge side, and between the upwind-side reinforcing section 4a and the downwind-side reinforcing section 4b on a trailing edge side.

5 Claims, 4 Drawing Sheets

WIND TURBINE BLADE AND WIND TURBINE GENERATOR USING THE SAME

RELATED APPLICATIONS

The present application is continuation from National Phase of International Application No. PCT/JP2010/070797 filed Nov. 22, 2010, and claims priority from Japanese Application No. 2009-290660, filed Dec. 22, 2009, the disclosure of which is hereby incorporated by reference herein in its entirety.

BACKGROUND OF THE INVENTION

1. Field of the Invention

The present invention relates to a wind turbine blade and a wind turbine generator using the wind turbine blade.

2. Description of the Related Art

The wind turbine blade for a wind turbine generator is desired to be lightweight, highly reliable and easy to manufacture for saving production time thereof. In view of making the wind turbine blade lightweight, the wind turbine blade is configured to have a laminated structure of composite materials. FIG. 1A is a sectional view schematically illustrating a structure of a wind turbine blade. The blade 100 comprises an outer shell 101 having a basic laminated structure, a leading edge reinforcing section 103 having a reinforced laminated structure, a trailing edge reinforcing section 105 (105a, 105b), a upwind-side reinforcing section 104a, a downwind-side reinforcing section 104b and a beam member 102. The leading edge reinforcing section 103, the trailing edge reinforcing section 105, the upwind-side reinforcing section 104a and the downwind-side reinforcing section 104b are arranged respectively in a leading part, a trailing part, a upwind-side part and a downwind-side part of the wind turbine blade 100.

To provide a wind turbine blade reduced in weight and still capable of maintaining the bending rigidity required for the wind turbine blade 100, the blade is constructed such that unidirectional reinforcing material of fiber-reinforced plastic is arranged in a location far from a flexural center X. The unidirectional reinforcing material is also referred to as UD material or 0° material. Thus, often used is the structure wherein UD material is intensively laminated in a center of the upwind-side and the downwind-side (the upwind-side reinforcing section 104a and the downwind-side reinforcing section 104b) and the leading edge part and trailing edge part (the leading edge reinforcing section 103 and the trailing edge reinforcing section 105a, 105b). The outer shell covering the entire surface of the blade 100 can be made of bias materials having plural layers of fiber-reinforced plastic (±45° material or multi-directional material). In the outer shell 101, the part in which UD material is not laminated (the parts other than the leading edge reinforcing section 103, the trailing edge reinforcing section 105a, 105b, the upwind-side reinforcing section 104a and the downwind-side reinforcing section 104b) has a structure such as a sandwich structure wherein, for instance, a core material is interposed between plural layers of bias materials.

FIG. 1B is a pattern diagram illustrating the laminated structure of FIG. 1A in detailed. In FIG. 1B, a solid line indicates a bias material (±45° material) 111, a dotted line indicates UD material (0° material) 112 and a trapezoid (rectangular) indicates a core material 113.

As the outer shell 101, n layers of ±45° material are provided on its outer side and m layers of ±45° material are provided on its inner side. "n" and "m" are both natural numbers. And in each part of the wind turbine blade 100, the following layers are provided between the n layers of ±45° material and them layers of ±45° material. Specifically, p layers of 0° material are provided between the n layers of ±45° material and the m layers of ±45° material in the leading edge reinforcing section 103; q layers of 0° material are provided between the n layers of ±45° material and the m layers of ±45° material in the upwind-side reinforcing section 104a/the downwind-side reinforcing section 104b; r layers of 0° material are provided between the n layers of ±45° material and the m layers of ±45° material in the trailing edge reinforcing section 105a/105b. "p", "q" and "r" are all natural numbers. In this case, the inequality of q>>q, r exists. For the remaining part, a single layer of core material 13 is provided. Further, the trailing tip (most outer edge) may be covered solely by the outer shell 101 (including the core material 113).

As shown in FIG. 2, 0° material (UD material) is a material whose resin is arranged 0° with respect to a longitudinal direction of the wind turbine blade. In the material, resin is penetrated. The material may be fiber-reinforced plastic whose fibers are laminated 0° with respect the longitudinal direction of the blade. Also shown in FIG. 2 is ±45° material. The ±45° material may be a material whose fibers are laminated one atop another in different directions +45° and −45° with respect to the longitudinal direction of the wind turbine blade. In the material, resin is penetrated. The material may be fiber-reinforced plastic whose fibers are arranged ±45° with respect to the longitudinal direction of the blade. The fiber is, for instance, carbon fiber, glass fiber and so on.

In the case described above, the leading edge reinforcing section 103 has the laminated structure having $(\pm 45°)_n/(0°)_p/(\pm 45°)_m$ in this order from the outer side to the inner side. The upwind-side reinforcing section 104a and the downwind-side reinforcing section 104b has the laminated structure having $(\pm 45°)_n/(0°)_q/(\pm 45°)_m$ in this order from the outer side to the inner side. The trailing edge reinforcing section 105a/105b has the laminated structure having $(\pm 45°)_n/(0°)_r/(\pm 45°)_m$ in this order from the outer side to the inner side. The rest has the laminated structure having $(\pm 45°)_n$/core material/$(\pm 45°)_m$ in this order from the outer side to the inner side. "±45°" and "0°" indicate 45° material and 0° material respectively and "n", "m", "p" and "r" respective indicate the number of layers.

JP2006-118434A discloses a production method of a lightweight wind turbine blade. The wind turbine blade is used for a vertical axis wind turbine generator. The wind turbine blade is configured such that a first half divided blade and a second half divided blade including wind turbine blade surface layers is laminated and formed by impregnating predetermined fiber material with resin material for lamination mixed with curing agent to form a predetermined space in a wind mill. Next, a blade support layer supporting in a thickness direction in the blade is laminated and formed on circumference surface of an elastic cylindrical member by impregnating a predetermined fiber member with resin material. Then, the cylindrical member is arranged at a predetermined position in a blade longitudinal direction in the blade to press an in-blade support layer against the first half divided blade and the second half divided blade respectively by elastic force in the blade to form the in-blade support layer as one unit with the first half divided blade and the second half divided blade and the first half divided blade and the second half divided blade are coupled and are left as they are for a predetermined period of time. By this, a wind turbine blade is formed by integration of all of the first half divided blade, the second half divided blade and the in-blade support layer by curing action of curing agent.

JP6-66244A discloses a wind turbine blade. The wind turbine blade has a main girder arranged in a longitudinal direction of an outer shell to enhance the strength. In the wind turbine blade, plural layers of unidirectional roving cloth are stacked one atop another along the longitudinal direction of the main girder, and normal glass cloth and a glass mat are stacked over the stack of layers of roving cloth into the shape of a bondage using the tape winding method.

RELATED ART DOCUMENTS

Patent Documents

[PATENT DOCUMENT 1] JP2006-118434A
[PATENT DOCUMENT 2] JP6-66244A

SUMMARY OF THE INVENTION

Object to be Solved

In the laminated structure illustrated in FIG. 1A and FIG. 1B, the UD material 112 needs to be laminated on the leading edge part (the leading edge reinforcing section 103) and the trailing edge part (the trailing edge reinforcing section 105) as well as the upwind side part (the upwind-side reinforcing section 104a) and the downwind-side part (the downwind-side reinforcing section 104b). There are many places where the UD material 112 needs to be laminated, which takes time and thus, the time for manufacturing is long. Further, the places near the blade root have an almost cylindrical shape as shown in FIG. 3. Thus, when laminating the UD material on the leading edge part (the leading edge reinforcing section 103) and the trailing edge part (the trailing edge reinforcing section 105), the UD material needs to be adhered on surfaces that are almost vertical. As a result, the UD material tends to droop down and it becomes difficult to manufacture the blade.

In view of the above issues, it is an object of the present invention to provide a wind turbine blade and a wind turbine generator using the wind turbine blade, which achieve a shorter manufacturing time and ease of the manufacturing. Another object of the present invention is to provide a wind turbine blade and a wind turbine generator using the wind turbine blade, which achieve a shorter manufacturing time and ease of the manufacturing while preventing the weight increase of the blade.

Means to Solve the Issues

Means to solve the issues are explained hereinafter using reference numbers and codes used in modes for carrying out the invention. The reference numbers and codes are shown in parentheses to explain correspondence relationships between the description in the scope of the claims and preferred embodiments of the present invention. However, the reference numbers and codes used here should not be used to understand the scope of the claims.

A wind turbine blade of one aspect of the present invention has a laminated structure. The laminated structure may include, but is not limited to, an outer shell (1) having a shape of the blade, an upwind-side reinforcing section (4a) which reinforces a upwind-side part of the blade in the outer shell (1) and a downwind-side reinforcing section (4b) which reinforces a downwind-side part of the blade in the outer shell (1). The outer shell (1) may include, but is not limited to, a first multidirectional material $(11:(\pm 45°)_n)$, a first unidirectional reinforcing material $(12:(0°)_N)$ and a second multidirectional material $(11:(\pm 45°)_m)$. The upwind-side reinforcing section (4a) may include, but is not limited to, a second unidirectional reinforcing material $(12:(0°)_Q)$ provided between the first unidirectional reinforcing material $(12:(0°)_N)$ and the second multidirectional material $(11:(\pm 45°)_m)$. The downwind-side reinforcing section (4b) may include, but is not limited to, a third unidirectional reinforcing material $(12:(0°)_Q)$ provided between the first unidirectional reinforcing material $(12:(0°)_N)$ and the second multidirectional material $(11:(\pm 45°)_m)$. The outer shell (1) may include, but is not limited to, a first core member (13) respectively provided between the upwind-side reinforcing section (4a) and the downwind-side reinforcing section (4b) on a leading edge side, and between the upwind-side reinforcing section (4a) and the downwind-side reinforcing section (4b) on a trailing edge side.

According to the aspect of the present invention, the bending rigidity required for the blade is achieved by laminating the unidirectional reinforcing material $(12:(0°)_N)$ on the outer shell (1) of the entire blade surface and providing the upwind-side reinforcing section (4a) and the downwind-side reinforcing section (4b). Thus, it is not necessary to provide in the leading edge part and the trailing edge part reinforcing sections reinforced by the unidirectional reinforcing material. As a result, the number of places where the UD material is provided can be reduced in the manufacturing process and also the time for the laminating process can be shortened in comparison to the conventional case. As a UD material for the leading edge part and the trailing edge part is not provided in the blade, it is possible to solve the issue that the manufacturing is difficult near the blade root where the shape of the blade is almost cylindrical, which causes the UD material to droop down.

The weight decrease from skipping the unidirectional reinforcing material in the leading edge part and the trailing edge part, can counteract the weight increase from using the unidirectional reinforcing material $(12:(0°)_N)$ in the outer shell (1) of the entire blade surface. As a result, the required rigidity of the blade can be obtained while maintaining the lightweight of the blade by suppressing the weight increase of the whole wind turbine blade.

In the wind turbine blade, a trailing edge reinforcing section (5a) that reinforces a trailing edge part of the blade in the outer shell (1) is also provided. The trailing edge reinforcing section (5a) may include, but is not limited to, a fourth unidirectional reinforcing material $(12:(0°)_Q)$ arranged between the first unidirectional reinforcing material $(12:(0°)_N)$ and the second multidirectional material $(11:(\pm 45°)_m)$. The outer shell (1) may include, but is not limited to, the first core member (13) respectively provided between the upwind-side reinforcing section (4a) and the downwind-side reinforcing section (4b) on the leading edge side, between the upwind-side reinforcing section (4a) and the trailing edge reinforcing section (5a), and between the downwind-side reinforcing section (4b) and the trailing edge reinforcing section (5b).

The bending rigidity required for the blade is achieved by providing the trailing edge reinforcing sections (5a, 5b) as well. Thus, it is not necessary to provide the reinforcing sections using the unidirectional reinforcing material in the leading edge part. As a result, the number of places where the UD material is provided can be reduced in the manufacturing process and also the time for the laminating process can be shortened in comparison to the conventional case. As a UD material for the leading edge part is not provided in the blade, it is possible to solve the issue that the manufacturing is difficult near the blade root where the shape of the blade is almost cylindrical, which causes the UD material to droop down.

The weight decrease from not using the unidirectional reinforcing material in the leading edge part, can counneract the weight increase from using the unidirectional reinforcing material in the outer shell (1) of the entire blade surface (although not as much as the case of not having the trailing edge reinforcing sections 5a, 5b). As a result, the required rigidity of the blade can be obtained while maintaining the lightweight of the blade by suppressing the weight increase of the whole wind turbine blade.

In the wind turbine blade, the outer shell (1) may also include, but is not limited to, a fifth unidirectional reinforcing material $(12:(0°)_M)$. The fifth unidirectional reinforcing material $(12:(0°)_M)$ is provided on an inner side of the second multidirectional material $(11:(\pm45°)_m)$ so as to be layered on the second multidirectional material $(11:(\pm45°)_m)$.

The unidirectional reinforcing material $(12:(0°)_M)$ is added on the outer shell (1) of the entire blade surface and thus, the bending rigidity can be enhanced.

In the wind turbine blade, the blade has the laminated structure from a root of the blade to vicinity of a maximum chord location at which a chord is maximum (S1) and has other laminated structure from the maximum chord location to a tip of the blade (S2).

By having the above described laminated structure (in S1) from the root of the blade to the vicinity of the maximum chord location at which a chord is maximum and skipping the UD material for the leading edge part alone or for the leading edge part and the trailing edge part, it is possible to solve the issue that the manufacturing is difficult near the blade root where the shape of the blade is almost cylindrical, which causes the UD material to droop down. As a result, the time for the laminating process can be shortened.

In the above wind turbine blade, the laminated structure (in S2) from the maximum chord location to the tip of the blade may include, but is not limited to other outer shell (101) having a shape of the blade, other upwind-side reinforcing section (104a) which reinforces the upwind-side part of the blade in said other outer shell, other downwind-side reinforcing section (104b) which reinforces the downwind-side part of the blade in the outer shell (101), other leading edge reinforcing section (103) which reinforces the leading edge part of the blade in the outer shell (101) and other trailing edge reinforcing section (105) which reinforces the trailing edge part of the blade in the outer shell (101). The outer shell (101) may include, but is not limited to, the first multidirectional material $(111:(\pm45°)_N)$ and the second multidirectional material $(111:(\pm45°)_m)$ which are layered. The upwind-side reinforcing section (104a) may include, but is not limited to, a sixth unidirectional reinforcing material $(112:(0°)_q)$ provided between the first multidirectional material $(111:(\pm45°)_n)$ and the second multidirectional material $(111:(\pm45°)_m)$. The downwind-side reinforcing section (104b) may include, but is not limited to, a seventh unidirectional reinforcing material $(112:(0°)_q)$ provided between the first multidirectional material $(111:(\pm45°)_n)$ and the second multidirectional material $(111:(\pm45°)_m)$. The leading edge reinforcing section (103) may include, but is not limited to, a eighth unidirectional reinforcing) $(111:(0°)_p)$ material provided between the first multidirectional material $(111:(\pm45°)_n)$ and the second multidirectional material $(111:(\pm)45°)_m)$. The trailing edge reinforcing section may include, but is not limited to, a ninth unidirectional reinforcing material $(111:(0°)_r)$ between the first multidirectional $(111:(\pm45°)_n)$ and the second multidirectional material $(111:(\pm45°)_m)$. The outer shell (101) may include, but is not limited to, a second core member (113) respectively provided between the upwind-side reinforcing section (104a) and the leading edge reinforcing section (103), between the upwind-side reinforcing section (104a) and the trailing edge reinforcing section (105), between the downwind-side reinforcing section (104b) and the leading edge reinforcing section (103), and between the downwind-side reinforcing section (104b) and the trailing edge reinforcing section (105).

The bending rigidity of the blade can be attained by providing, from the maximum chord location to the tip of the blade (in S2), the downwind-side reinforcing section (104b), the leading edge reinforcing section (103) and the trailing edge reinforcing section (105) without using the unidirectional reinforcing material in the outer shell (101) of the entire blade surface. As a result, the wind turbine blade can be lighter in comparison to the case of laminating the unidirectional reinforcing material on the entire blade surface.

Another aspect of the present invention is a wind turbine generator having a rotor head supported rotatably with respect to a nacelle and a wind turbine blade which is mounted on a rotor head. A wind turbine rotor is constituted of the rotor head and the wind turbine blade and the turbine rotor is rotated by a wind force and rotation energy of the turbine rotor is converted to power generation energy. As the wind turbine blade has the above-mentioned technical features, it is possible to achieve the high bending rigidity and the shorter manufacturing time and the ease of the manufacturing as described before.

Effects of the Invention

According to the present invention, it is possible to provide a wind turbine blade and a wind turbine generator using the wind turbine blade that achieve a shorter manufacturing time and ease of the manufacturing. It is also possible to provide a wind turbine blade and a wind turbine generator using the wind turbine blade that achieve a shorter manufacturing time and ease of the manufacturing while preventing the weight increase of the blade.

DETAILED DESCRIPTION OF THE PREFERRED EMBODIMENTS

Preferred embodiments of the present invention will now be described in detail with reference to the accompanying drawings. It is intended, however, that unless particularly specified, dimensions, materials, shape, its relative positions and the like shall be interpreted as illustrative only and not limitative of the scope of the present invention. In the preferred embodiments, components which are not relevant to a laminated structure of a wind turbine blade, such as a girder are already know and thus will not be explained further.

Figure 7:
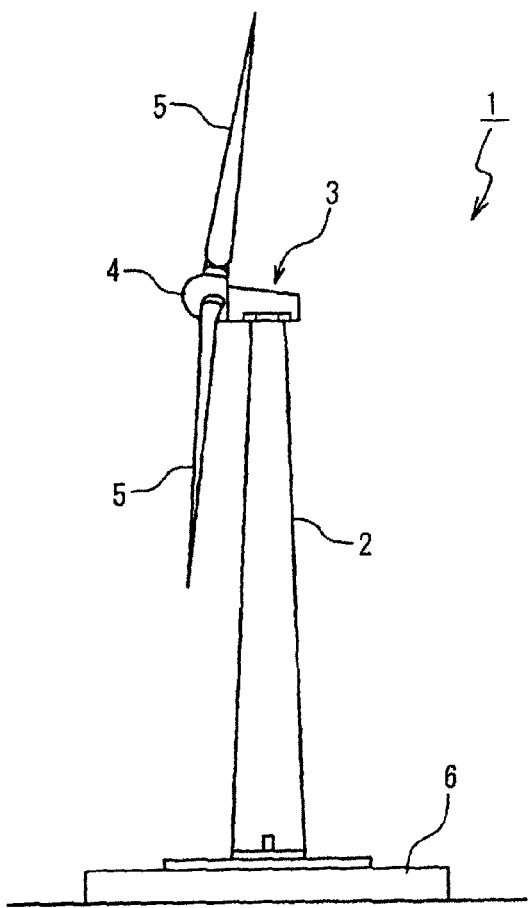
FIG. 7 A side-view showing a structure of a wind turbine generator which uses the wind turbine blade of the preferred embodiments of the present invention.

FIG. 7 is a side-view showing a structure of a wind turbine generator 1 which uses the wind turbine blade of preferred embodiments of the present invention. The wind turbine generator 1 includes a support 2 standing upright from a base 6, a nacelle 3 mounted on the top of the base 2, a rotor head mounted rotatably with respect to the nacelle 3 and blades 5 mounted on the rotor head 4. The rotor head and the blades 5 constitute a wind turbine rotor.

First Preferred Embodiment

Figure 4A:
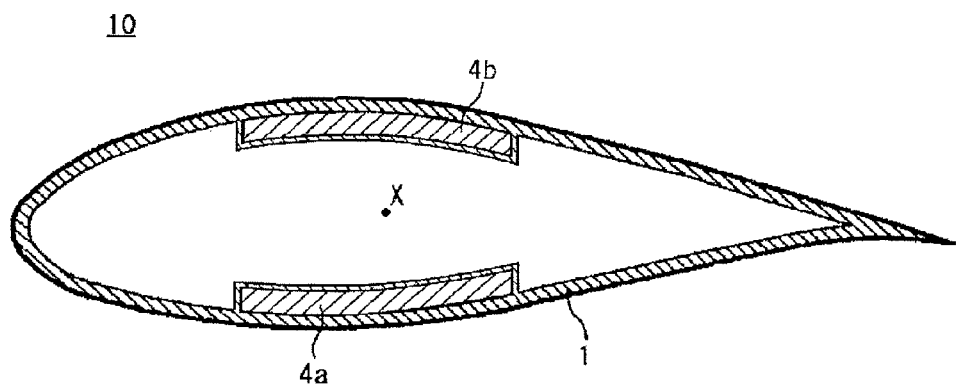
FIG. 4A A schematic view showing a structure of a wind turbine blade in relation to a first preferred embodiment of the present invention.

A wind turbine blade in relation to a first preferred embodiment of the present invention is described in reference to the attached drawings. FIG. 4A is a schematic view showing a structure of the wind turbine blade in relation to the first preferred embodiment of the present invention. This wind turbine blade 10 has an outer shell 1 of a basic laminated structure, an upwind-side reinforcing section 4a and a downwind-side reinforcing section 4b. The upwind-side reinforcing section 4a and the downwind-side reinforcing section 4b have a reinforced laminated structure. The upwind-side reinforcing section 4a and the downwind-side reinforcing section 4b are provided in an upwind-side part and a downwind-side part of the wind turbine blade 10 respectively.

A structure having a fiber-reinforced plastic of unidirectional reinforcing material 12 (UD material or 0° material) arranged in a location far from a flexural center X is popular to make a lighter blade 10 while maintaining the bending rigidity required for the blade. In the preferred embodiment of the present invention, the UD material 12 is layered in the outer shell 1 as well. By this, the UD material 12 is disposed on the upwind-side part and the downwind-side part of the blade (the upwind-side reinforcing section 4a and the downwind-side reinforcing section 4b) to be layered intensively while it is not necessary to provide the UD material 12 on the leading edge part and the trailing edge part. This structure is described below in detail.

The outer shell 1 includes bias materials 11 (referred to as ±45° material or multi-directional material which is a multilayer of fiber-reinforced plastic, of which a blade surface of the wind turbine blade 10 is made, or the like. In the outer shell 1, the parts in which the UD material 12 is not provided (the parts other than the upwind-side reinforcing section 4a and the downwind-side reinforcing section 4b) have a structure such as a sandwich structure wherein, for instance, a core material 13 is interposed between plural layers of the bias materials 11.

Figure 4B:
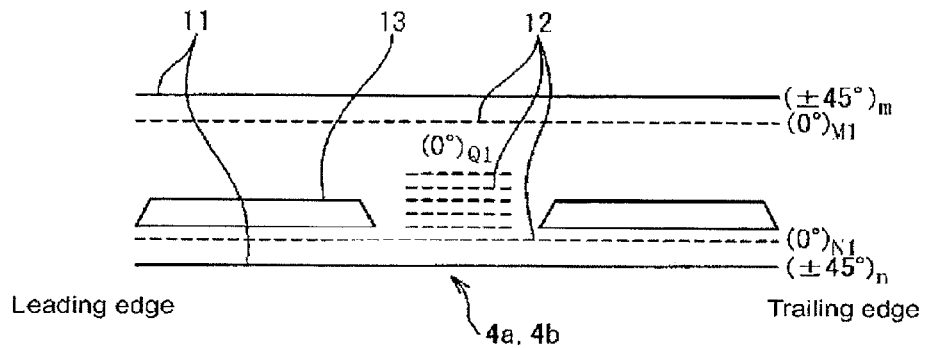
FIG. 4B A schematic view showing a laminated structure of FIG. 4A.

FIG. 4B is a schematic view showing the laminated structure of FIG. 4A. In the drawing, the solid line indicates the bias material (±45° material), the dotted line indicates the UD material 12 (0° material), and the trapezoid (rectangular) indicates a core material 13.

As the outer shell 1, n layers of ±45° material, N1 layers of 0° material, M1 layers of 0° material, m layers of ±45° material are respectively arranged in this order from the outer side to the inner side of the outer shell 1. "n", "m", "N1" and "M1" are all natural numbers (positive integer numbers) and the inequalities of N1+M1≧1, N1≧1, M1≧0 exist. And in the following parts of the wind turbine blade 10, the layers as described below are provided between the N1 layers of 0° material and the M1 layers of 0° material. Specifically, Q1 layers of 0° material are provided between the N1 layers of 0° material and the M1 layers of 0° material in the upwind-side reinforcing section 4a/downwind-side reinforcing section 4b ("Q" is a natural number). In this case, "Q1" is smaller than "q" (see FIG. 1B). The bending rigidity is improved by using 0° material in the outer shell 1. In the remaining part, a single layer of core material 13 is provided. In consideration of the required rigidity, the number of layers (Q1) may be different in the upwind-side reinforcing section 4a and the downwind-side reinforcing section respectively.

Figure 2:
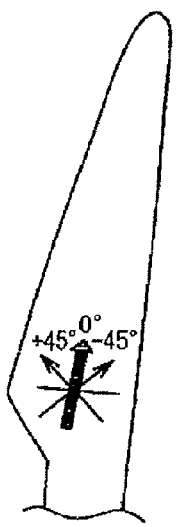
FIG. 2 A schematic view showing 0° material and ±45° material of the laminated structure of FIG. 1B.
Figure 3:
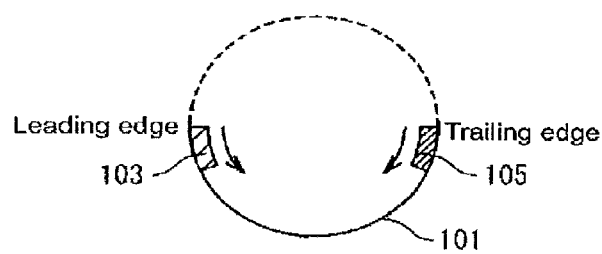
FIG. 3 A schematic view showing a root of a wind turbine blade.

0° material (UD material) 12 and ±45° material (bias material) 11 are the UD material 112 and the bias material 111 aforementioned in reference to FIG. 2.

In the case described above, the upwind-side reinforcing section 4a/the downwind-side reinforcing section 4b has the laminated structure having $(\pm 45°)_n/(0°)_{N1}/(0°/(0°)_{M1}/(\pm 45°)_m$ in this order from the outer side to the inner side. The other parts has the laminated structure having $(\pm 45°)_n/(0°)_{N1}/$core material/$(0°)_{M1}/(\pm 45°)_m$ in this order from the outer side to the inner side. "±45°" and "0°" respectively indicate ±45° material and 0° material and "n", "m", "N1", "Q1" and "M1" respective indicate the number of layers.

The number of layers (N1 layers) of the UD material to be layered on the whole outer shell is the smallest number that can attain the bending rigidity required for the blade without the UD material for reinforcing the leading edge part and the trailing edge part being provided. This smallest number of layers can be determined by methods such as tests and simulations. In this manner, the number of layers of the UD material to be layered on the whole outer shell is set as small as possible so as to prevent the weight increase of the blade.

In the preferred embodiment, the bending rigidity required for the blade is achieved by laminating the unidirectional reinforcing 0° material (UD material) on the outer shell of the whole blade surface. Thus, the structure in which the leading edge part and the trailing edge part are not laminated intensively with the UD material can be achieved. As a UD material for the leading edge part and the trailing edge part is not provided in the blade, the number of places where the UD material is provided can be reduced in the manufacturing process and also the time for the laminating process can be shortened in comparison to the conventional case. As a UD material for the leading edge part and the trailing edge part is not provided in the blade, it is possible to solve the issue that the manufacturing is difficult near the blade root where the shape of the blade is almost cylindrical, which causes the UD material to droop down.

In the preferred embodiment, the upwind-side part and the downwind-side part are intensively laminated with the UD material while the leading edge part and the trailing edge part is not intensively laminated with the UD material. In such a case that the bending rigidity is obtained solely by the UD material laminated on the outer shell while skipping the UD material laminated intensively, the amount of the UD material to be used increases and the weight increase is significant. Therefore, in the preferred embodiment, the UD material is provided in the outer shell and also intensively provided in the upwind-side part and the downwind-side part, and thus the amount of the UD material to be used additionally can be suppressed and the blade can remain light and still possess the required bending rigidity.

Therefore, according to the preferred embodiment, it is possible to reduce the manufacturing time of the wind turbine blade and achieve the ease of the manufacturing while maintaining the lightweight and the bending rigidity of the wind turbine blade.

Second Preferred Embodiment

Figure 5A:
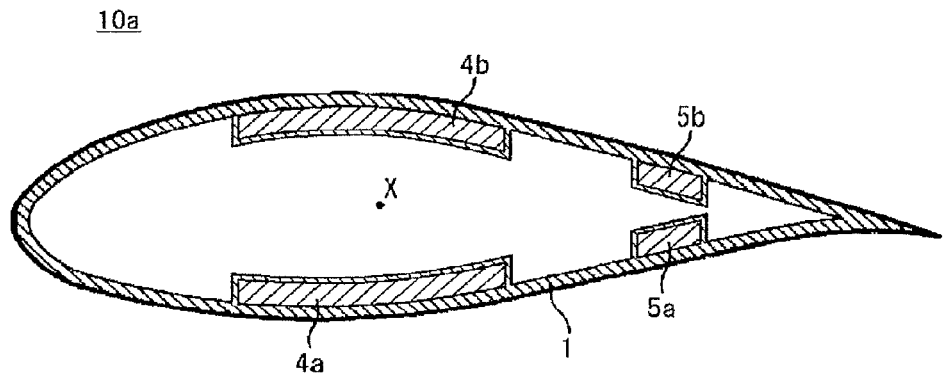
FIG. 5A A sectional view schematically showing a structure of a wind turbine blade in relation to a second preferred embodiment of the present invention.

A wind turbine blade in relation to a second preferred embodiment of the present invention is described in reference to the attached drawings. FIG. 5A is a sectional view schematically showing a structure of a wind turbine blade in relation to the second preferred embodiment of the present invention. The wind turbine blade 10a has an outer shell 1 of a basic laminated structure, an upwind-side reinforcing section 4a, a downwind-side reinforcing section 4b, and trailing edge reinforcing sections 5a, 5b. The upwind-side reinforcing section 4a, the downwind-side reinforcing section 4b and the trailing edge reinforcing sections 5a, 5b have a reinforced laminated structure. The upwind-side reinforcing section 4a, the downwind-side reinforcing section 4b and the trailing edge reinforcing sections 5a, 5b are provided in the upwind-side part, the downwind-side and the leading edge part of the wind turbine blade 10 respectively.

The second preferred embodiment is different from the first preferred embodiment in that the UD material 12 of the fiber-reinforced plastic is intensively provided not only on the upwind side (the upwind-side reinforcing section 4a) and the downwind side (the downwind-side reinforcing section 4b) but also on the leading edge side (the leading edge reinforcing sections 5a, 5b). Specifically, by laminating the UD material 12 on the outer shell 1, the additional UD material 12 is intensively laminated on the upwind side (the upwind-side reinforcing section 4a), the downwind side (the downwind-side reinforcing section 4b) and the leading edge side (the leading edge reinforcing sections 5a, 5b) but not on the leading edge part. The reason that UD material is provided in the trailing edge part instead of the leading edge part for the reason that the UD material is to be disposed far from the flexural center X to reduce the weight of the blade while maintaining the bending rigidity. This is further explained below in detail.

The outer shell 1 includes bias materials 11 (referred to as ±45° material or multi-directional material) which is a multi-layer of fiber-reinforced plastic, of which a blade surface of the wind turbine blade 10 is made, or the like. In the outer shell 1, the parts in which the UD material 12 is not provided (the parts other than the upwind-side reinforcing section 4a, the downwind-side reinforcing section 4b and the trailing edge reinforcing sections 5a, 5b) have a structure such as a sandwich structure wherein, for instance, a core material 13 is interposed between plural layers of the bias materials 11.

Figure 5B:
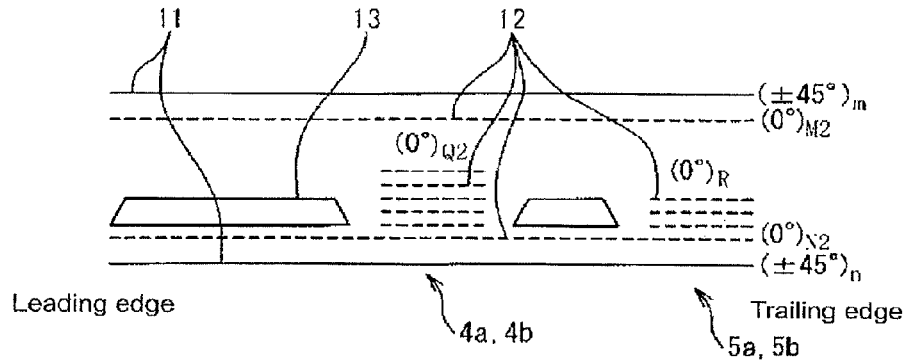
FIG. 5B A schematic view showing a laminated structure of FIG. 5A.

FIG. 5B is a schematic view showing the laminated structure of FIG. 5A. In the drawing, the solid line indicates the bias material (±45° material), the dotted line indicates the UD material 12 (0° material), and the trapezoid (rectangular) indicates the core material 13.

As the outer shell 1, n layers of ±45° material, N2 layers of 0° material, M2 layers of 0° material, m layers of 45° material are respectively arranged in this order from the outer side to the inner side of the outer shell 1. "n", "m", "N2" and "M2" are all natural numbers and inequalities of $N2+M2 \geq 1$, $N2 \geq 1$, $M2 \geq 0$ exist. And in the following parts of the wind turbine blade 10, the layers as described below are provided between the N2 layers of 0° material and the M2 layers of 0° material. Specifically, Q2 layers of 0° material are provided in the upwind-side reinforcing section 4a/downwind-side reinforcing section 4b ("Q2" is a natural number) and R layers of 0° material are provided in the trailing edge reinforcing sections 5a, 5b ("R2" is a natural number). In this case, $Q2<q$ (see FIG. 1B) and $R<r$ (see FIG. 1B) can be achieved. The bending rigidity is improved by using 0° material in the outer shell 1. It is also possible to achieve $M2 \leq M1$, $N2 \leq N1$ and $Q2 \leq Q1$ (see FIG. 4B). This is because the bending rigidity is enhanced by providing the trailing edge reinforcing sections 5a, 5b. For the remaining part, a single layer of core material 13 is provided. In consideration of the required rigidity, the number of layers (Q2) may be different in the upwind-side reinforcing section 4a and the downwind-side reinforcing section respectively. In consideration of the required rigidity, the number of layers (R) may be different in each of the trailing edge reinforcing sections 5a and 5b respectively.

0° material (UD material) 12 and ±45° material (bias material) 11 are the UD material 112 and the bias material 111 aforementioned in reference to FIG. 2.

In the case described above, the upwind-side reinforcing section 4a/the downwind-side reinforcing section 4b has the laminated structure having $(\pm 45°)_n/(0°)_{N2}/(0°)_{Q2}/(0°)_{M2}/(\pm 45°)_m$ in this order from the outer side to the inner side. The railing edge reinforcing sections 5a, 5b has the laminated structure having $(\pm 45°)_n/(0°)_{N2}/(0°)_R/(0°)_{M2}/(\pm 45°)_m$ in this order from the outer side to the inner side. The other parts has the laminated structure having $(\pm 45°)_n/(0°)_{N2}/$core material$/(0°)_{M2}/(\pm 45°)_m$ in this order from the outer side to the inner side. "±45°" and "0°" respectively indicate ±45° material and 0° material and "n", "m", "N2", "Q2", "R" and "M2" respective indicate the number of layers. A trailing tip of the trailing edge part may have only the outer shell 101 (including the core material 13).

The number of layers (N2 layers) of the UD material to be layered on the whole outer shell is the smallest number of layers that can achieve the bending rigidity required for the blade without the UD material for the leading edge part being provided. This smallest number of layers can be determined by methods such as a test and a simulation. In this manner, the number of layers of the UD material to be layered on the whole outer shell is set as small as possible so as to suppress the weight increase of the blade.

In the preferred embodiment, the bending rigidity required for the blade is achieved by laminating the unidirectional reinforcing 0° material (UD material) on the outer shell of the whole blade surface. Thus, the structure in which the leading edge part is not laminated intensively with the UD material can be achieved. As a UD material for the leading edge part is not provided in the blade, the number of places where the UD material is provided can be reduced in the manufacturing process and also the time for the laminating process can be shortened in comparison to the conventional case. As a UD material for the leading edge part is not provided in the blade, it is possible to solve the issue that the manufacturing is difficult near the blade root where the shape of the blade is almost cylindrical causing the UD material to droop down.

In the preferred embodiment, the upwind-side part, the downwind-side part and the trailing edge part are intensively laminated with the UD material while the leading edge part is not intensively laminated with the UD material. In such a case that the bending rigidity is obtained solely by the UD material laminated on the outer shell while skipping the UD material laminated intensively, the amount of the UD material to be used increases and the weight gain is significant. Therefore, in the preferred embodiment, the UD material is provided in the outer shell and also intensively provided in the upwind-side part, the downwind-side part and the trailing edge part and thus the amount of the UD material to be needed additionally can be suppressed and the blade can remain light weight and still possess the required bending rigidity.

The second preferred embodiment is different from the first preferred embodiment in that the UD material is intensively provided in the trailing edge part as well, thereby reducing the amount of the UD material to be used in the outer shell. As a result, the amount of the UD material to be needed can be suppressed and the blade can remain lightweight and still possess the required bending rigidity.

Therefore, according to the preferred embodiment, it is possible to reduce the manufacturing time of the wind turbine blade and achieve the ease of the manufacturing while maintaining the lightweight and the bending rigidity of the wind turbine blade.

Third Preferred Embodiment

Figure 6:
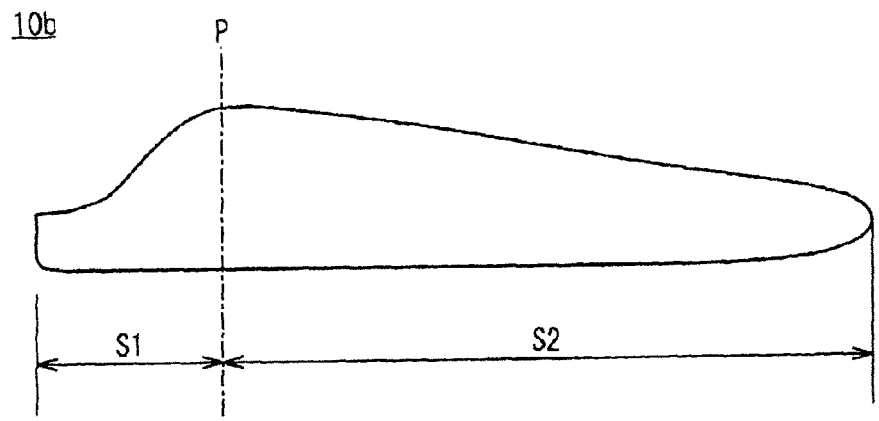
FIG. 6 A sectional view schematically showing a structure of a wind turbine blade in relation to a third preferred embodiment of the present invention.

A wind turbine blade in relation to a third preferred embodiment of the present invention is described in reference to the attached drawings. FIG. 6 is a sectional view schematically showing a structure of a wind turbine blade in relation to the third preferred embodiment of the present invention. This wind turbine blade 10b has a blade root section S1 and a main section S2.

In the preferred embodiment, instead of applying the same laminated structure to the entire wind turbine blade, the blade root section S1 from the root to vicinity of a maximum chord location of the blade, and the main section S2 from the maximum chord location to a tip of the blade have different laminated structures. This is different from the first and second preferred embodiments. The above structure is described in detailed below.

The blade root section S1 is near the blade root and has an almost cylindrical shape, which causes the UD material to droop down. Thus, the laminated structure of the first preferred embodiment (see FIG. 4A and FIG. 4B) is used in the blade root section S1. Specifically, in the blade root section S1 from the root to vicinity of a maximum chord location of the blade, the UD material 12 is laminated on the entire blade surface and the additional UD material 12 for the leading edge part and the trailing edge part is not provided. As a result, it is possible to solve the issue that the manufacturing is difficult near the blade root where the shape of the blade is almost cylindrical, which causes the UD material to droop down. Alternatively, the laminated structure of the second preferred embodiment (FIG. 5A and FIG. 5B) may be applied to the blade root section S1.

Figure 1A:
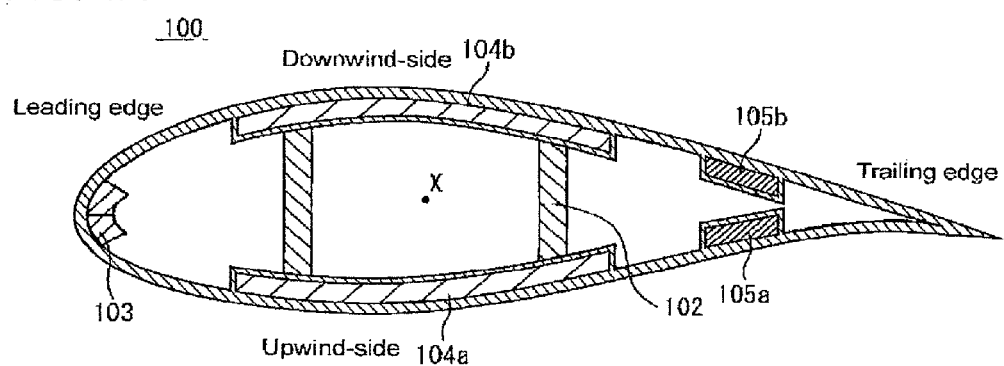
FIG. 1A A sectional view schematically showing a structure of a wind turbine blade.
Figure 1B:
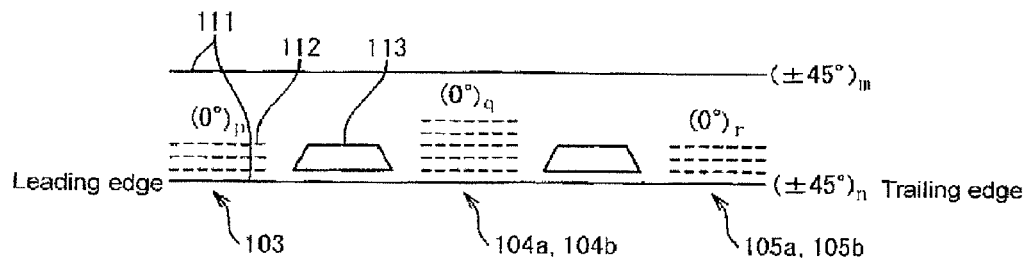
FIG. 1B A schematic view showing a laminated structure of FIG. 1A.

The main section S2 has the laminated structure of the related art (FIG. 1A and FIG. 1B). Specifically, in the main section S2 from the maximum chord location to the tip of the blade, the UD material 12 for the entire blade surface is not provided, and instead the UD material 12 is intensively provided in the leading edge part, the trailing edge part, the upwind part and the downwind part. As a result, in comparison to the case of laminating the UD material on the entire blade surface, the amount of the UD material to be used is minimized and thus, the weight of the blade can be reduced more. Alternatively, other laminated structure (e.g. FIG. 5A and FIG. 5B or FIG. 4A and FIG. 4B) different from the structure of the blade root section S1 may be applied to the main section S2.

In such a case that the blade root section S1 and the main section S2 have the same structure, these sections S1 and S2 is formed continuously (integrally). For instance, the bias materials 11 on the inner side and the outer side of the outer shell 1 and the core material 13 between the bias materials of the blade root section S1 can be formed continuously (integrally) with the bias material 111 on the inner side and the outer side of the outer shell 101 and the core material 113 between the bias materials 111 of the main section S2. As a result, the wind turbine blade can be integrally as a whole.

Therefore, according to the preferred embodiment, it is possible to reduce the manufacturing time of the wind turbine blade and achieve the ease of the manufacturing while maintaining the lightweight and the bending rigidity of the wind turbine blade.

The wind turbine blades 10, 10a, 10b of the first, second and third preferred embodiments are light and have high bending rigidity. The wind turbine blades can be used for a wind turbine generator as a wind turbine which requires shorter time for manufacturing and has the ease of the manufacturing.

The present invention is not limited to the above preferred embodiments and it is to be understood that various changes and modifications will be apparent to those skilled in the art within the scope of the present invention. Unless there is technical inconsistency, the configurations described in each of the preferred embodiments can be interchanged and combined with one another.

The invention claimed is:

1. A wind turbine blade comprising a laminated structure which comprises an outer shell having a shape of the blade, an upwind-side reinforcing section which reinforces a upwind-side part of the blade in the outer shell and a downwind-side reinforcing section which reinforces a downwind-side part of the blade in the outer shell,
   wherein the outer shell comprises a first multidirectional material, a first unidirectional reinforcing material and a second multidirectional material which are layered,
   wherein the upwind-side reinforcing section comprises a second unidirectional reinforcing material provided between the first unidirectional reinforcing material and the second multidirectional material,
   wherein the downwind-side reinforcing section comprises a third unidirectional reinforcing material provided between the first unidirectional reinforcing material and the second multidirectional material,
   wherein the outer shell comprises a first core member, respectively provided between the upwind-side reinforcing section and the downwind-side reinforcing section on a leading edge side, and between the upwind-side reinforcing section and the downwind-side reinforcing section on a trailing edge side, and
   wherein the blade comprises the laminated structure from a root of the blade to vicinity of a maximum chord location at which a chord is maximum and the blade comprises other laminated structure from the maximum chord location to a tip of the blade.

2. The wind turbine blade according to claim 1,
   wherein the laminated structure further comprises a trailing edge reinforcing section which reinforces a trailing edge part of the blade in the outer shell,
   wherein the trailing edge reinforcing section comprises a fourth unidirectional reinforcing material arranged between the first unidirectional reinforcing material and the second multidirectional material, and
   wherein the outer shell comprises the first core member respectively provided between the upwind-side reinforcing section and the downwind-side reinforcing section on the leading edge side, between the upwind-side reinforcing section and the trailing edge reinforcing section, and between the downwind-side reinforcing section and the trailing edge reinforcing section.

3. The wind turbine blade according to claim 1,
   wherein the outer shell comprises a fifth unidirectional reinforcing material which is provided on an inner side of the second multidirectional material so as to be layered on the second multidirectional material.

4. The wind turbine blade according to claim 1,
wherein said other laminated structure comprises other outer shell having a shape of the blade, other upwind-side reinforcing section which reinforces the upwind-side part of the blade in said other outer shell, other downwind-side reinforcing section which reinforces the downwind-side part of the blade in said other outer shell, other leading edge reinforcing section which reinforces the leading edge part of the blade in said other outer shell and other trailing edge reinforcing section which reinforces the trailing edge part of the blade in said other outer shell,
wherein said other outer shell comprises the first multidirectional material and the second multidirectional material which are layered,
wherein said other upwind-side reinforcing section comprises a sixth unidirectional reinforcing material provided between the first multidirectional material and the second multidirectional material,
wherein said other downwind-side reinforcing section comprises a seventh unidirectional reinforcing material provided between the first multidirectional material and the second multidirectional material,
wherein said other leading edge reinforcing section comprises a eighth unidirectional reinforcing material provided between the first multidirectional material and the second multidirectional member,
wherein said other trailing edge reinforcing section comprises a ninth unidirectional reinforcing material between the first multidirectional material and the second multidirectional material, and
wherein said other outer shell comprises a second core member respectively provided between said other upwind-side reinforcing section and said other leading edge reinforcing section, between said other upwind-side reinforcing section and said other trailing edge reinforcing section, between said other downwind-side reinforcing section and said other leading edge reinforcing section, and between said other downwind-side reinforcing section and said other trailing edge reinforcing section.

5. A wind turbine generator comprising a rotor head supported rotatably with respect to a nacelle and the wind turbine blade according to claim 1 which is mounted on a rotor head,
wherein a wind turbine rotor is constituted of the rotor head and the wind turbine blade,
wherein the turbine rotor is rotated by a wind force and a rotation energy of the turbine rotor is converted to power generation energy.

* * * * *